Dec. 18, 1956 V. LOMBARDI 2,774,233
KNITTED TERRY FABRICS
Filed July 12, 1952 10 Sheets-Sheet 1

Inventor:
Vincent Lombardi
by Robert Irving Williams
Att'y.

Dec. 18, 1956    V. LOMBARDI    2,774,233
KNITTED TERRY FABRICS
Filed July 12, 1952    10 Sheets-Sheet 2

Inventor:
Vincent Lombardi
by Robert Irving Williams
Att'y.

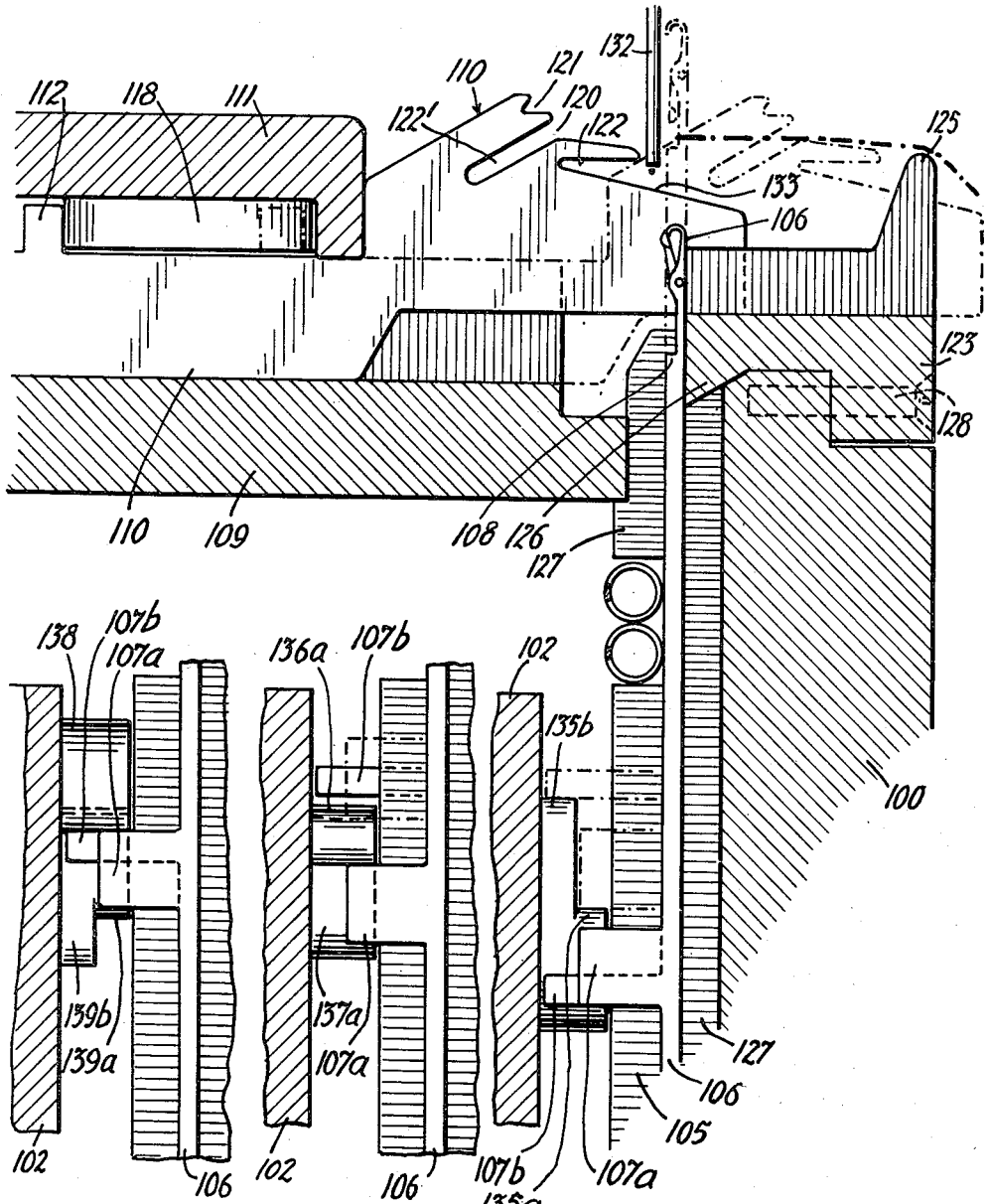

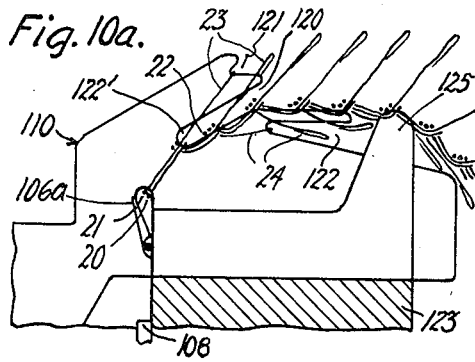
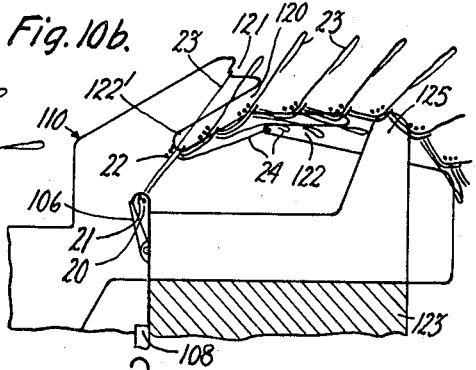
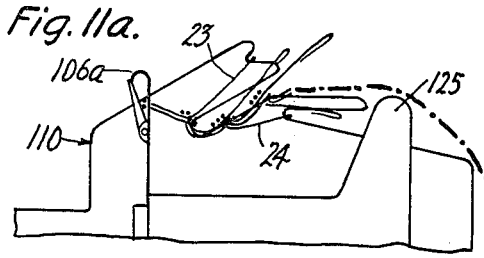
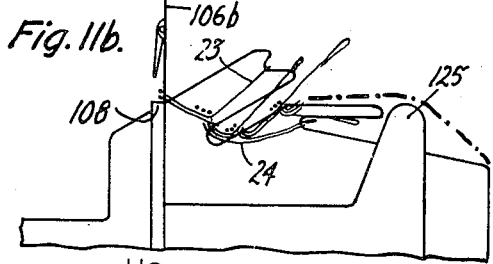
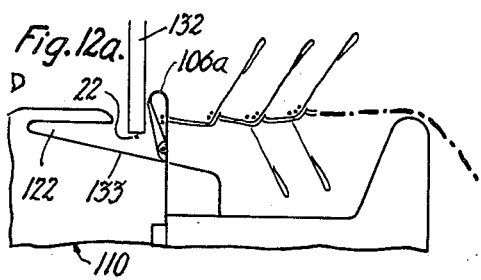
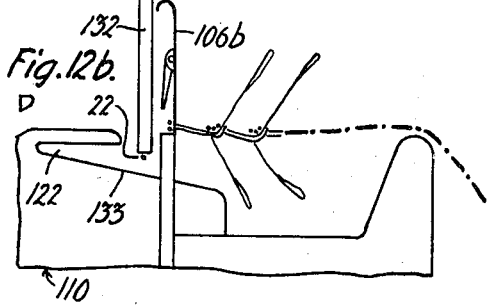
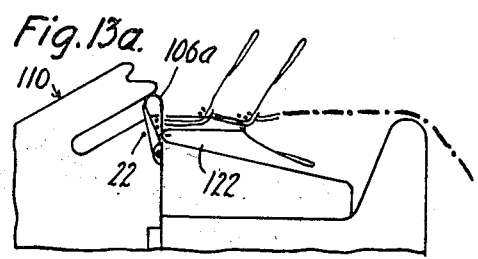
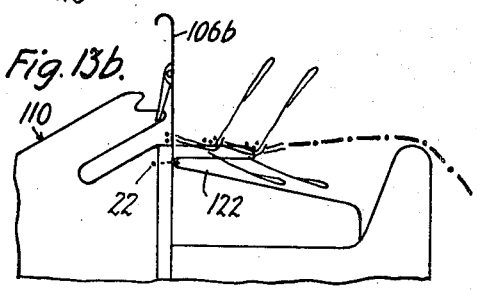
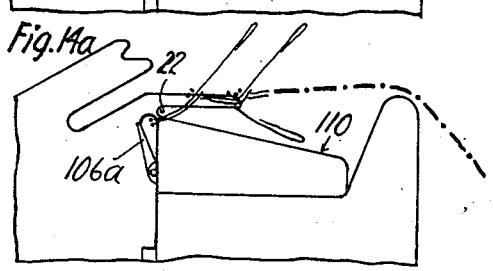
Inventor:
Vincent Lombardi

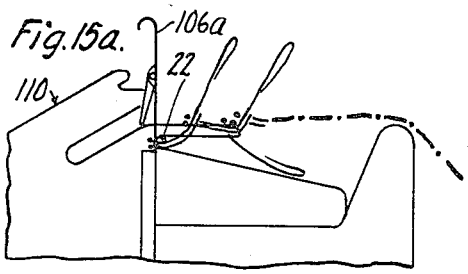
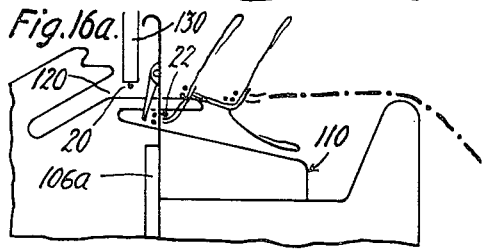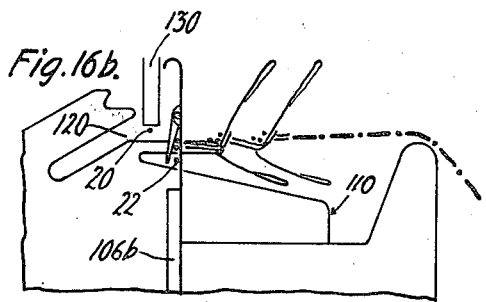
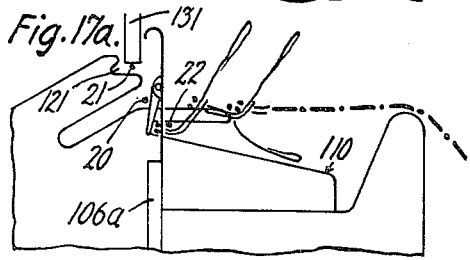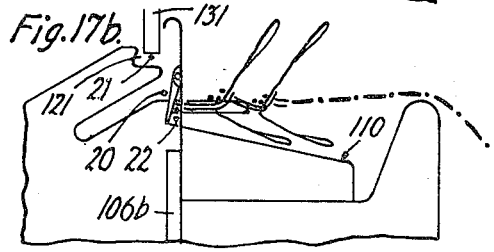
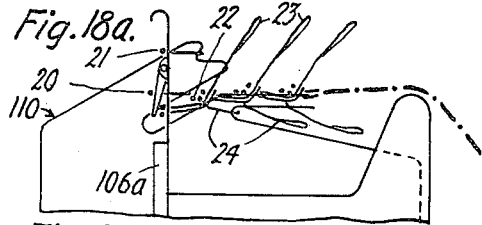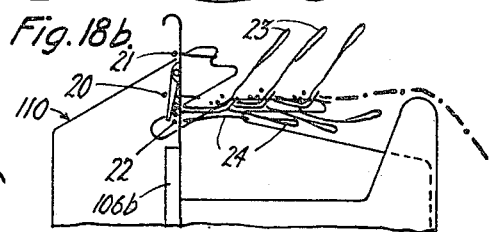
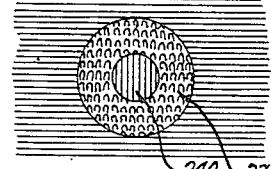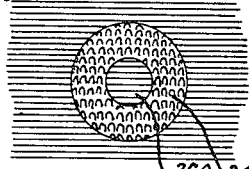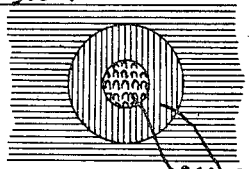
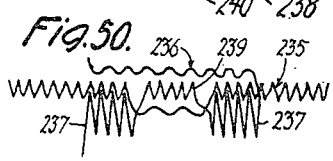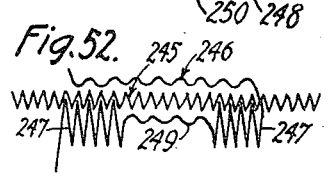
Inventor:
Vincent Lombardi
by Robert Irving Williams
Att'y.

Dec. 18, 1956 V. LOMBARDI 2,774,233
KNITTED TERRY FABRICS
Filed July 12, 1952 10 Sheets-Sheet 6

Inventor:
Vincent Lombardi
by Robert Irving Williams
Att'y.

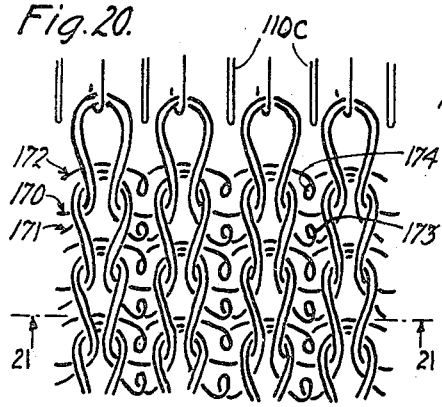
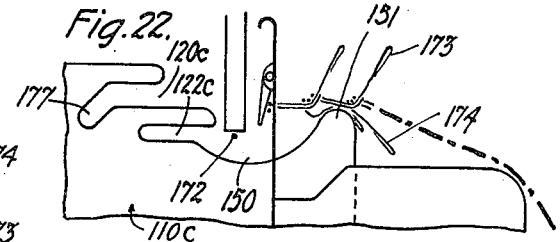
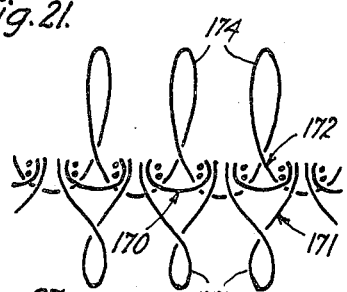
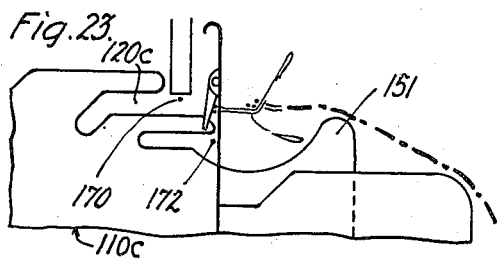
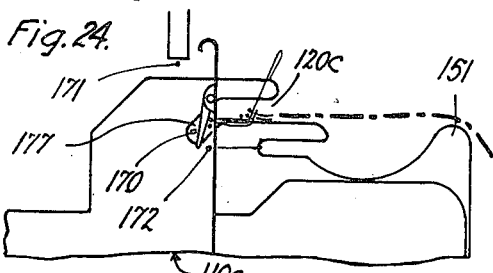
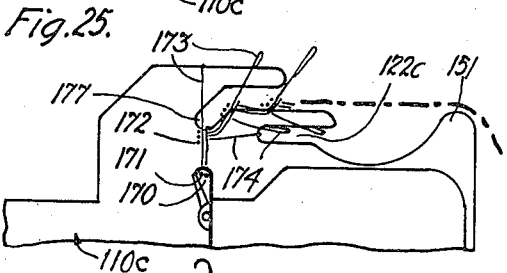
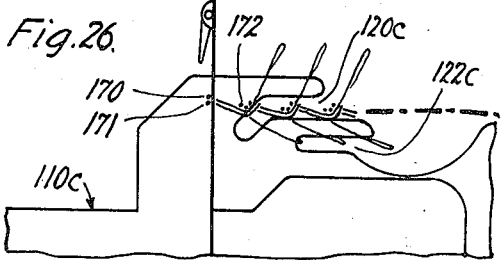

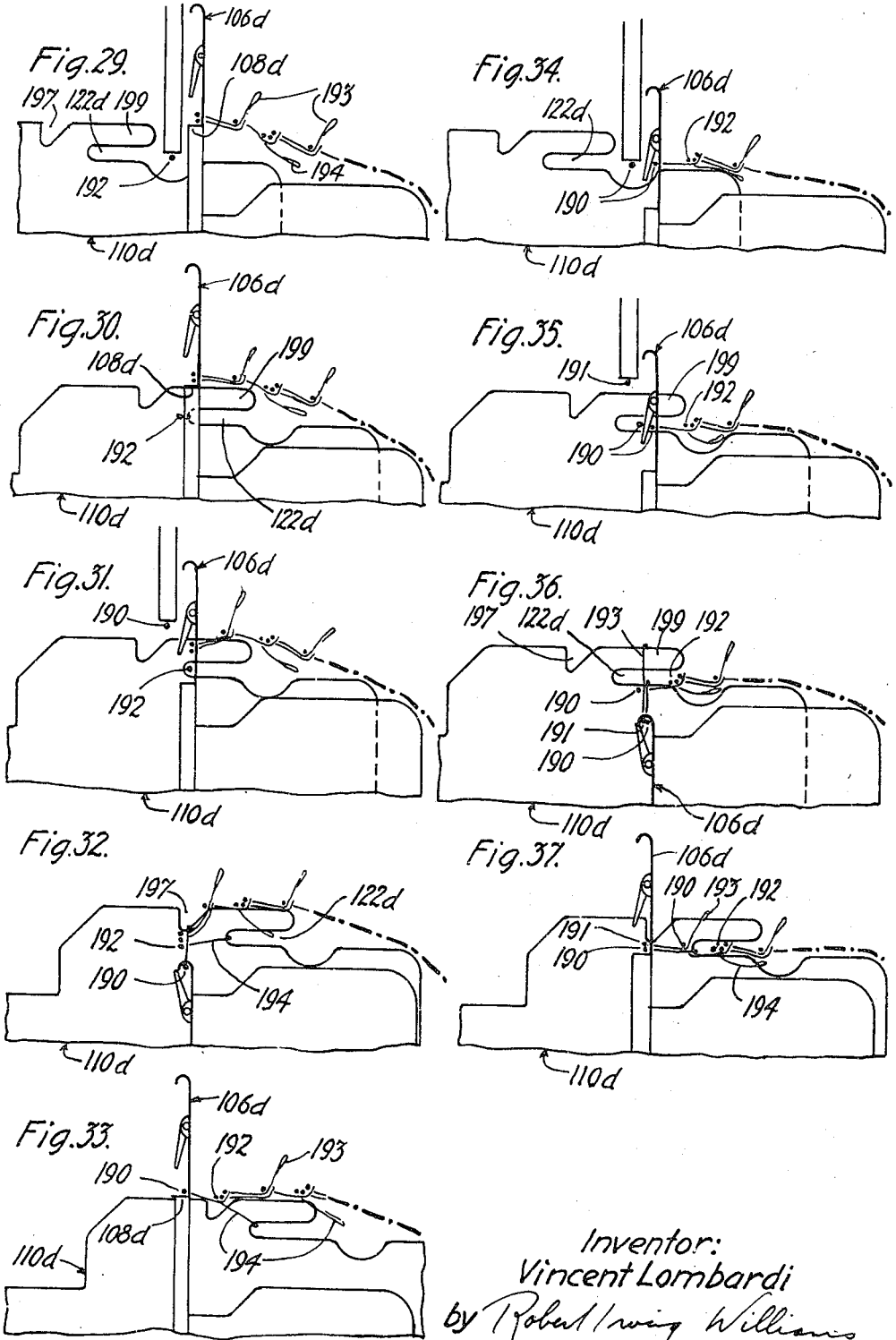

Dec. 18, 1956 V. LOMBARDI 2,774,233
KNITTED TERRY FABRICS
Filed July 12, 1952 10 Sheets-Sheet 9

Inventor:
Vincent Lombardi
by Robert Irving Williams
Att'y.

Dec. 18, 1956  V. LOMBARDI  2,774,233
KNITTED TERRY FABRICS
Filed July 12, 1952  10 Sheets-Sheet 10
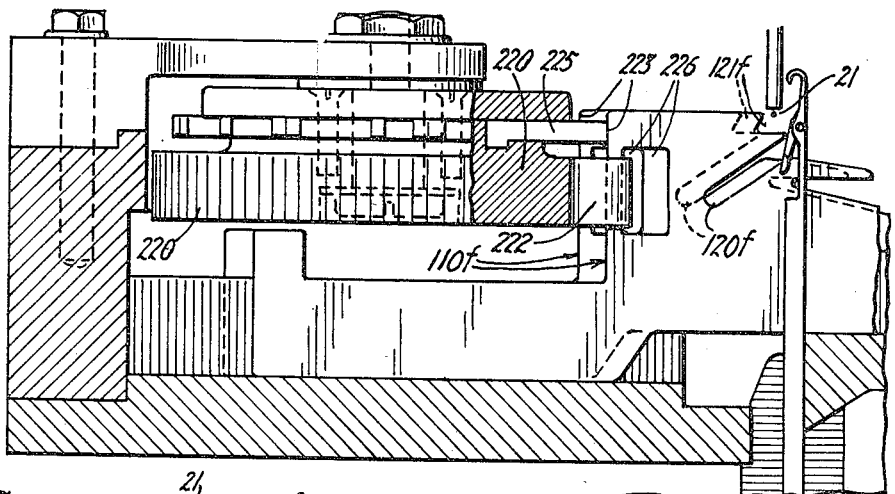
Fig. 46.
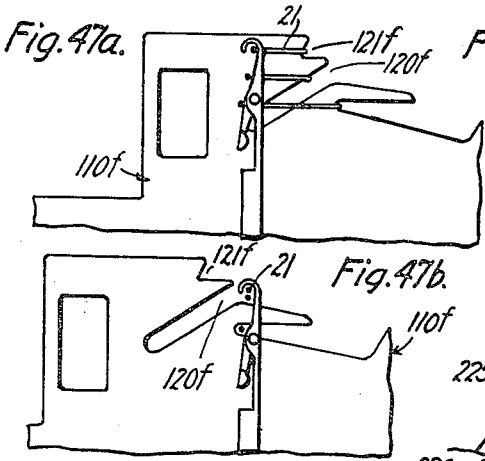
Fig. 47a.
Fig. 47b.
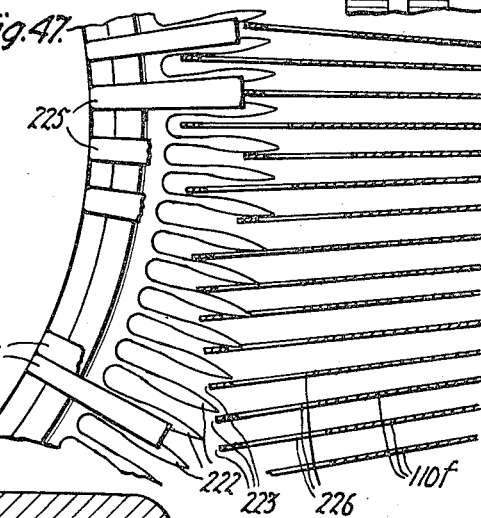
Fig. 47.
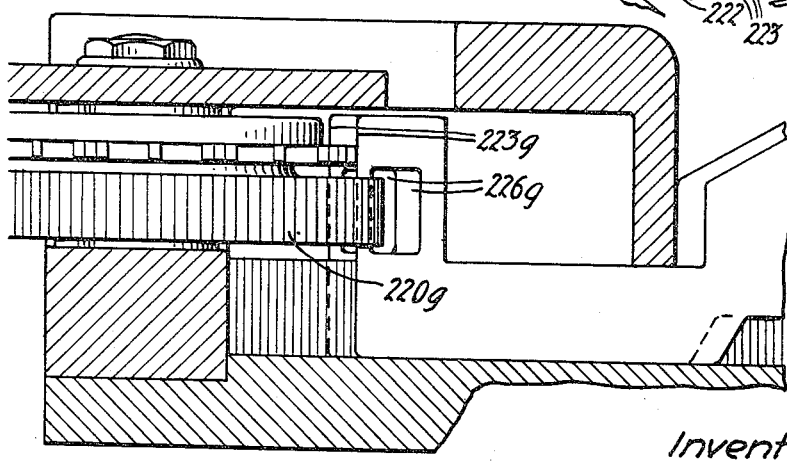
Fig. 48.
Inventor:
Vincent Lombardi
by Robert Irving Williams
Att'y.

United States Patent Office 2,774,233
Patented Dec. 18, 1956

2,774,233

KNITTED TERRY FABRICS

Vincent Lombardi, Miami, Fla.

Application July 12, 1952, Serial No. 298,565

12 Claims. (Cl. 66—191)

This invention relates to knitted fabric.

Terry cloth fabrics have a wide field of usefulness including situations where the terry loops serve as loose pilings, where they are brushed to provide relatively smooth heavy surfacing, where they are utilized to seal and protect the base fabric, and where they are used to provide design effects. However, the demands of the practical art are many and varied, and the types of terry cloth heretofor provided have failed in many instances to meet these demands.

With the foregoing and other considerations in view, the present invention contemplates the provision of terry cloth of a variety of improved characteristics wherein novel effects are provided and novel purposes effectively served.

The invention, accordingly, comprises fabrics which possess the characteristics, properties, or relations of elements, and the interrelation thereof, all as exemplified in the accompanying drawings and in the following detailed disclosure, the scope of the application thereof being indicated in the claims.

For a fuller understanding of the nature and objects of the invention, reference should be had to the following detailed description taken in connection with the accompanying drawings, in which:

Fig. 9 is a transverse sectional view of a portion of one form of knitting machine embodying the invention;

Fig. 9a is a detail view of the needle operating cams for the machine in Fig. 9;

Fig. 9b is another detail view like that of Fig. 9a;

Fig. 10a is a diagrammatic view illustrating a step in the operation of a needle and sinker in the formation of the fabric of Figs. 5–8;

Fig. 10b is a similar view illustrating a corresponding step in the operation of an adjacent needle and sinker;

Figs. 11a and 11b are similar views of a later stage of the operation;

Figs. 12a and 12b are similar views of a later stage of the operation;

Figs. 13a and 13b are similar views of a later stage of the operation;

Fig. 14a is a similar view of a later stage of the operation;

Fig. 15a is a similar view of a later stage of the operation;

Figs. 16a and 16b are similar views of a later stage of the operation;

Figs. 17a and 17b are similar views of a later stage of the operation;

Figs. 18a and 18b are similar views of a later stage of the operation;

Fig. 20 is a diagrammatic front view of another form of fabric embodying the invention;

Fig. 21 is a horizontal sectional view along the line 21—21 of Fig. 20;

Figs. 22–26 are diagrammatic views illustrating respectively successive steps in the formation of the fabric of Figs. 20–21 on a machine of the character exemplified in Fig. 9;

Fig. 27 is a diagrammatic front view of another form of fabric embodying the invention;

Fig. 28 is a horizontal sectional view along the line 28—28 of Fig. 27;

Fig. 29 is a diagrammatic view illustrating a modified form of sinker and a step in the use thereof in the formation of fabric in Figs. 28–29;

Figure 45:
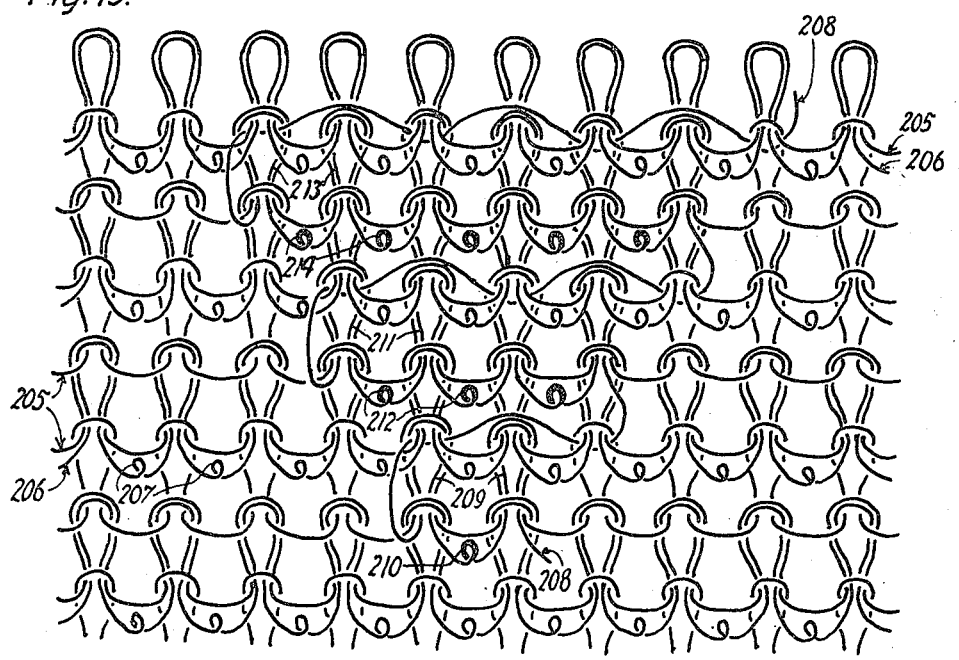
Figure 38:
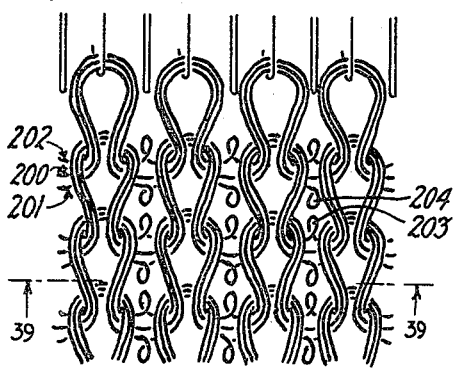
Figure 39:
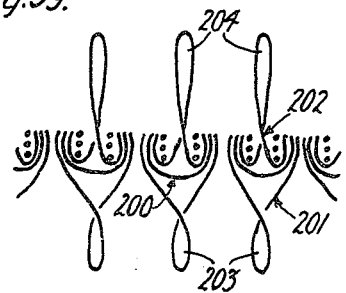
Figure 55:
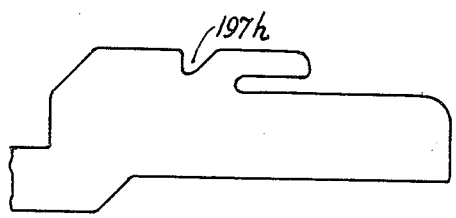
Figure 40:
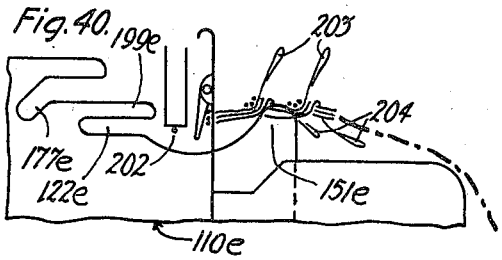
Figure 41:
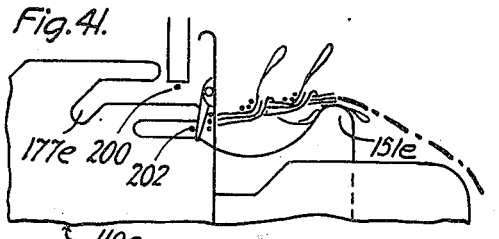
Figure 42:
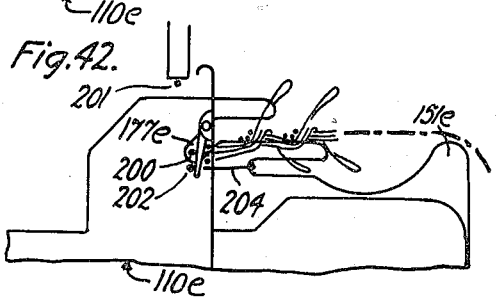
Figure 43:
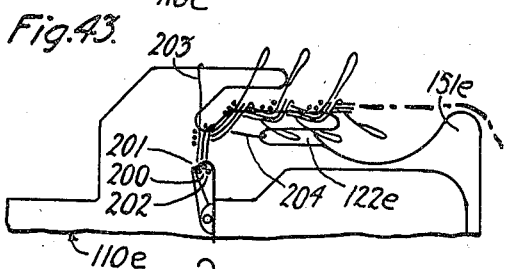
Figure 44:
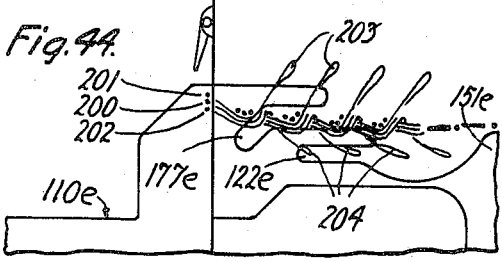

Fig. 30 shows a later step;
Fig. 31 shows a later step;
Fig. 32 shows a later step;
Fig. 33 shows a later step;
Fig. 34 shows a later step;
Fig. 35 shows a later step;
Fig. 36 shows a later step;
Fig. 37 shows a later step;

Fig. 38 is a front view of still another form of fabric embodying the invention;

Fig. 39 is a horizontal sectional view along the line 39—39 of Fig. 38;

Fig. 40 is a diagrammatic view illustrating a step in the formation of the fabric of Figs. 38–39 on a machine of the character exemplified in Fig. 9;

Fig. 41 shows a later step;
Fig. 42 shows a later step;
Fig. 43 shows a later step;
Fig. 44 shows a later step;

Fig. 45 is a diagrammatic rear view of one form of design fabric embodying the invention;

Fig. 46 is a transverse sectional view of a portion of a form of machine similar to that of Fig. 9 arranged for selective sinker operation;

Fig. 47 is a top view of the portion shown in Fig. 46;

Figs. 47a and 47b are detail views showing needles and sinkers in two different positions in the machine of Fig. 46;

Fig. 48 is a transverse sectional view of another form of machine similar to that of Fig. 9 arranged for selective sinker operation;

Fig. 49 is a schematic view of another form of design fabric embodying the invention;

Fig. 50 is a schematic sectional view along the line 50—50 therethrough;

Fig. 51 is a schematic view of still another form of design fabric embodying the invention;

Fig. 52 is a schematic sectional view along the line 52—52 therethrough;

Fig. 53 is a schematic view of a further form of design fabric embodying the invention;

Fig. 54 is a schematic sectional view along the line 54—54 therethrough; and,

Fig. 55 is a side view of another form of sinker embodying the invention in one of its aspects.

In Figs 1-4 there is exemplified one form of terry fabric embodying the invention. This fabric comprises yarn 10 which is jersey-knit into a base fabric, terry yarn 11 which is caught between the needle loops in one row and the sinker loops in an adjacent row in alternate wales, and additional terry yarn 12 which is worked into the fabric by having sinker terry loops 13 drawn out at the front of the fabric between wales. The yarn 11 is drawn out into terry loops 14 at the back of the fabric between the wales in which it is caught. As exemplified, the yarn 11 is caught in different wales in different rows, being caught in the odd-numbered wales of every other row and the even-numbered wales of intervening rows in the present instance.

In the form of fabric shown in Figs. 5-8, a yarn 20 is jersey-knit into a base fabric, a yarn 21 is plated therewith but is drawn out into sinker terry loops 23 at the back of the fabric, and a yarn 22 is caught into the fabric in alternate wales between needle loops in one row and sinker loops in an adjacent row, and is drawn out between these wales to provide terry loops 24 at the front of the fabric.

Figure 1:
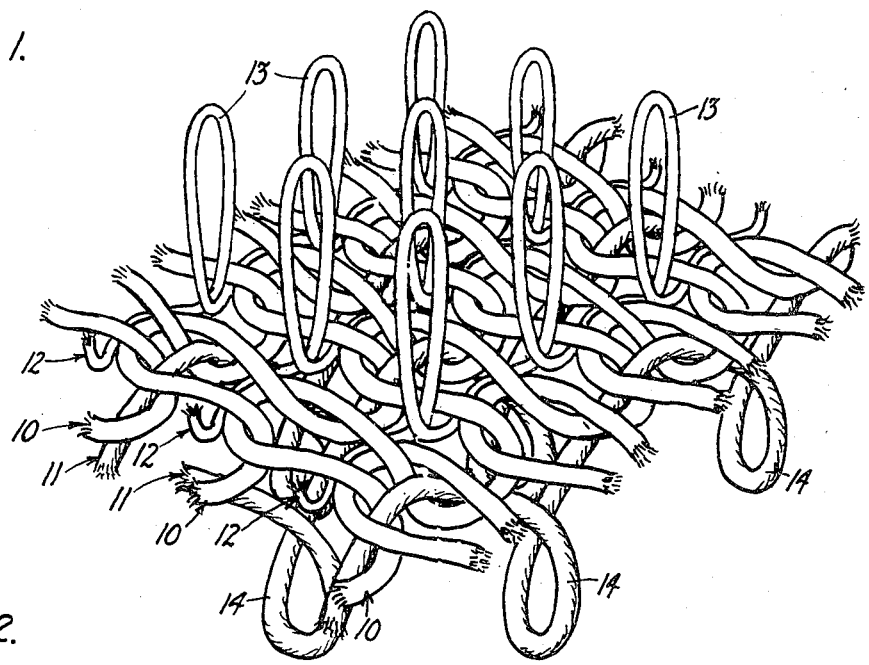
Figure 1 is a perspective view of one form of fabric embodying the invention, with the front of the fabric on top.
Figure 2:
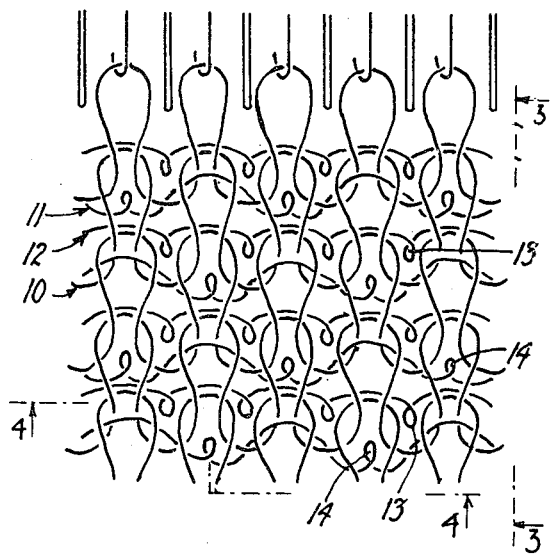
Fig. 2 is a diagrammatic front view of the fabric of Fig. 1.
Figure 3:
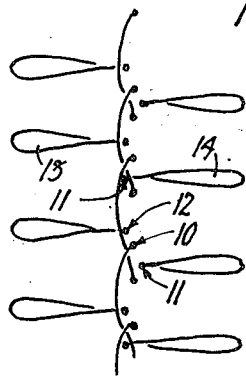
Fig. 3 is a vertical sectional view of the fabric along the line 3—3 of Fig. 2.
Figure 4:
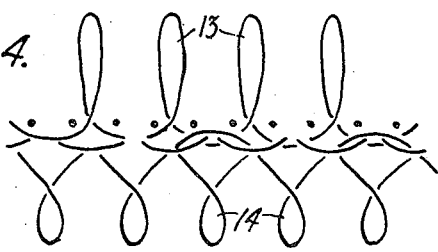
Fig. 4 is a horizontal sectional view of the fabric along the line 4—4 of Fig. 2.
Figure 5:
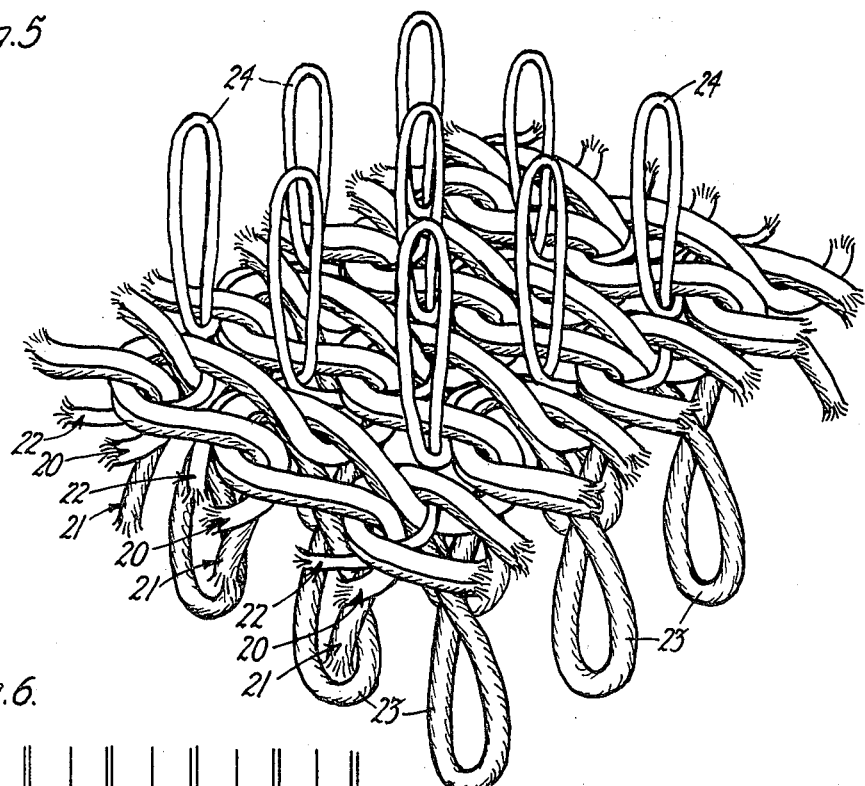
Fig. 5 is a perspective view of another form of fabric embodying the invention.
Figure 6:
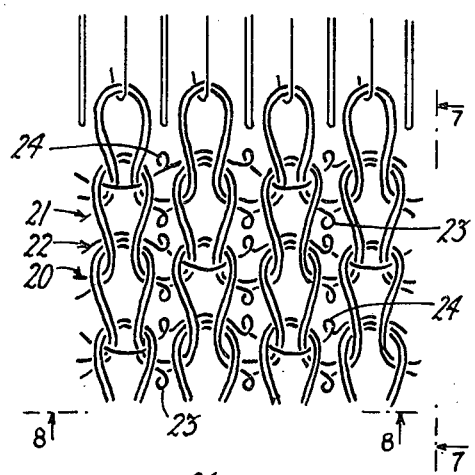
Fig. 6 is a diagrammatic front view thereof.
Figure 7:
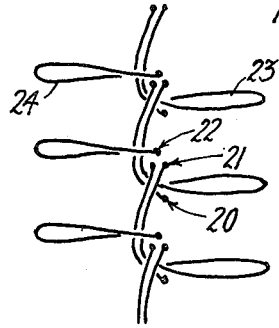
Fig. 7 is a vertical sectional view along the line 7—7 of Fig. 5.
Figure 8:
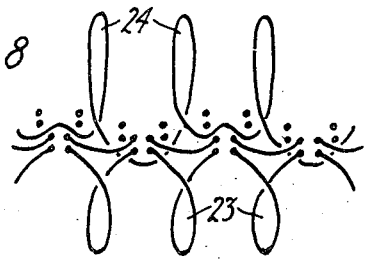
Fig. 8 is a horizontal sectional view along the line 8—8 of Fig. 5.

In Figs. 9, 9a and 9b, there is exemplified a form of knitting machine adapted for use in the production of the fabric of Figs. 1 and 5. As will be seen from Fig. 9, this machine comprises a needle cylinder 100 which, in the present instance, is stationary and about which revolves a cam ring 102. The cylinder is formed with slots 105 in which latch needles 106 are slidably mounted. Some of the needles are formed with short, wide butts 107a and others with long narrow butts 107b. Each needle has a shoulder 108 formed in the shank a short distance below the open latch.

Carried on the cylinder is a sinker bed 109 on which special terry sinkers 110 are mounted for sliding movement pursuant to the rotation of a sinker cam ring 111. The sinkers are formed with butts 112 and the sinker cam ring is formed with a plurality of cams for moving all the sinkers in and out in known manner, including a retracting cam 118 shown in Fig. 9. Each of the sinkers is formed with a plurality of notches or slots (three in the present instance), main slot 120, an upper (terry) slot 121, and a lower (terry) slot 122. It is to be noted that the slot 120 is considerably deeper than the slots 121 and 122. As shown at 122', the slot 120 dips downwardly toward the rear so that, as the sinker advances, a yarn received by this slot will be drawn down to a lower level and will form a comparatively short loop, as for the fabric loops, while yarn received by the slots 121 and 122 will form longer loops, as for the terry loops.

There is mounted on the cylinder, a fabric-lift element 125. This fabric-lift element 125 maintains the fabric at about the level of the lower horizontal edge of the slot 120, which is the normal fabric level. The fabric-lift element is, in the present instance, formed on a ring 123 the upper portion of which is slotted to guide the inner end of the sinkers, and which forms an annular rim 126 serving to retain the cylinder inserts 127 which provide the needle slots 105 therebetween. Screws 128 secure the ring 123 in place.

In order to feed yarn to the needles, there are provided three yarn feeds (see Figs. 10a to 18a, and 10b to 18b), a yarn feed 130 whereby body yarn such, for example, as the yarn 20, may be fed at the normal level of slot 120 in the present instance, a yarn feed 131 whereby yarn such as the terry yarn 21 may be fed on the level of the slot 121, and a yard feed 132 whereby yarn such as the terry yarn 22 may be fed on the level of slot 122. The sinkers are cut low as at 133 to facilitate passage of the yarn feed 132.

As is shown particularly in Figs. 9, 9a, and 9b, the cam ring 102 carries cams 135a and 135b for raising needles with butts 107a and 107b, respectively, to two different levels; a cam 136a for lowering the butts 107a a short distance; a cam 137a for again raising the butts 107a; a cam 138 for thereafter lowering both types of needles and cams 139a and 139b for retracting all needles to knitting position.

For the sequential operation of the mechanism of Fig. 9 for the formation of a fabric such as shown in Fig. 5, reference may be made to Figs. 10a to 18a which show successive stages in the operation of a needle 106a and an associated sinker 110a in the knitting of the odd-numbered wales, in which the yarn 22 is caught, and to Figs.10b to 18b which show corresponding stages in the operation of a needle 106b and an associated sinker 110b in the knitting of the even-numbered wales. The needles 106a for the odd-numbered wales have the short wide butts 107a, and the intermediate needles 106b have the long narrow butts 107b. It should be understood the two types of needles may be arranged in larger alternating groups with the same or different number of needles therein.

In Figs. 10a and 10b, the needles 106a and 106b are in fully retracted position having been retracted by cams 139a and 139b to form the plated loops of main yarn 20 and rear yarn 21 in combination with the rear terry loop 23 and front terry loop 24. In Figs. 11a and 11b, needle 106a has been raised to an intermediate position by cam 107a, needle 106b has been raised to clearing position by cam 107b, and the new loops have been raised to normal fabric level by the upward movement of the needles. In Figs. 12a and 12b, the front yarn 22 is being fed by yarn carrier 132 over the low cut edge 133 of the sinker slot 122, the sinkers being partly retracted. In Figs. 13a and 13b, the sinkers have been advanced to force the front yarn inside the needle row by the bottom of slot 122. In Fig. 14a, needle 106a is shown slightly lowered as by cam 136a to pass the front yarn over the hook so that in Fig. 15a the needle may be raised outside the front yarn into casting position by cam 137a. Thus, as shown in Figs. 16a and 16b, the front yarn, for the purpose of being inlaid in the fabric as shown in Fig. 5, lies alternately inside and outside the needles and above and below the last formed loops, respectively, when the main yarn carrier 130 passes. The sinkers have again been retracted to permit the carrier 130 to pass and feed yarn over the horizontal edge of slot 120, and the needles have been lowered sufficiently to permit the yarn to be fed above the tip of the open latch. In Figs. 17a and 17b, the sinkers have been further retracted to permit yarn carrier 131 to feed rear yarn 21 to the slot 121. In Figs. 18a and 18b, the sinkers have begun their inward movement to tighten the back yarn 21 in slots 121 and the main yarn in slots 120, so that the needles may be lowered to knitting position by cams 139a and 139b, as shown in Figs. 10a and 10b, while the sinkers continue their inward movements, thereby forming a normal length fabric loop and longer back loops and front loops, the length of the three sinker loops being determined simultaneously by the relative locations of the bottoms of the slots 121, 120, 122 with respect to the retracted needle hook.

Figure 19:
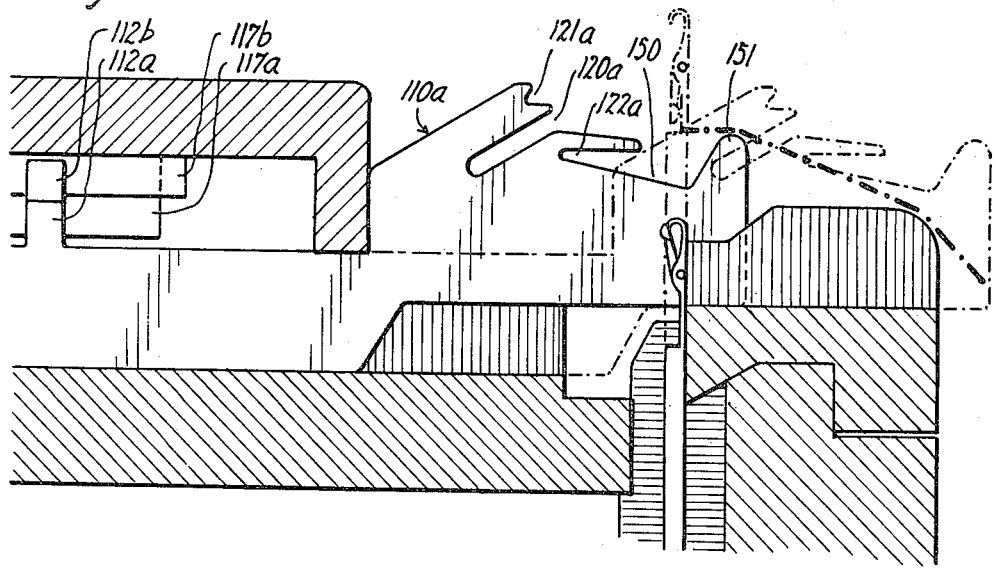
Fig. 19 is a transverse sectional view of a portion of another form of knitting machine embodying the invention and adapted to produce the fabric of Figs. 5–8.

The form of construction exemplified in Fig. 19 is, except as hereafter indicated, generally similar to that of Fig. 9, similar parts being indicated by similar reference numerals distinguished by the subscript a.

It is to be appreciated, of course, that many of the arrangements exemplified heretofore and hereafter are interchangeable and that, because of particular form of mechanism is shown in one form of construction, it is no less applicable to other forms of construction.

In this form of construction, the fixed fabric-lift element 125 is omitted, but the sinkers 110a are cut low at 150 leaving humps 151 on their inner ends the tops of which are at the normal fabric level. The hollowed-out portion provides space for the front terry yarn to be fed under the fabric, and to insure that it gets into a lower throat 122b. The weight of the hanging fabric draws that portion of the fabric which lies above the sinkers taut so that it is maintained on the level of the horizontal edge of the middle slot 120a. Only certain of the sinkers in the present instance are formed with short butts 112a, and other of the sinkers are formed with long butts 112b. Cams 117a and 117b are provided for advancing the sinkers with short and long butts respectively. In this manner, yarn such as 21 may be formed into sinker terry loops as at 23 at those points where the sinkers have long butts 112b but will not have terry loops formed therein at points where the sinkers have short butts 112a.

In the form of fabric shown in Figs. 20–21, main yarn 170 is knit into jersey-loops, rear terry yarn 171 is plated therewith in the needle loops, and drawn out into rear sinker terry loops as at 173 and terry yarn 172 extends around the needle loops and is drawn out into front sinker loops as at 174.

Such a fabric may be formed by the use of sinkers 110c and other mechanism of the general character exemplified in Fig. 9 except that the usual type of needles, without shoulders 108, are employed. Means to hold the fabric on a normal level are provided. Such means may comprise an annulus 125 as exemplified in Fig. 9. But, as exemplified, the sinkers have hollowed-out portions 150 and humps 151 forwardly thereof, as shown in Fig. 19. The sinkers in the present instance are provided with a lower slot 122c and a slot 120c above it. The slot 120c dips downwardly at the rear as shown at 177.

In the formation of the fabric of Figs. 20–21, a front terry yarn 172 (see Fig. 22), which has been fed by a yarn feed as it passes through the hollow 150, is entering the slot 122c. As shown in Fig. 23 a main yarn 170 is entering the slot 120c, the sinkers having advanced so that the yarn 172 is held within the slot 122c. As shown in Fig. 24 rear terry yarn 171 is shown above the sinker, the sinker having been advanced so as to draw out loops of the front yarn 172, and to move the main yarn 170 down into the dip 177 of the slot 120c. As shown in Fig. 25, the needle has been retracted, drawing out loops of the yarn 171 over the top of the sinker and knitting loops of the main yarn 170 and rear terry yarn 171. As shown in Fig. 30, the needle has been advanced so that the previously formed loops have cleared its latch.

In the form of fabric exemplified in Figs. 27–28, there is provided main yarn 190 wherewith back yarn 191 is knit in alternate courses and drawn out to provide rear terry loops 193, and wherewith front yarn 192 is incorporated in the intermediate courses and is drawn out to provide front terry loops 194.

In Figs. 29–37 there is exemplified a modified form of sinker and needle and a manner of formation of the fabric of Figs. 27–28 thereon. The needles 106d are formed with a wide shank terminating in a shoulder 108d, and the sinkers 110d have notches 197 serving the purpose of the dips 177 enabling the upper nib and the major portion of the upper throat of the sinker to be dispensed with.

In Fig. 29 the needle is shown raised. It is to be observed that the shoulder 108d has lifted the fabric loops to a level above the nib 199 of the sinker. A front yarn 192 is shown as it is fed in line with the sinker throat 122d. As shown in Fig. 30 the sinker has moved forward to bring the nib 199 between the fabric loops and the yarn 192. As shown in Fig. 31 the needle is moving downwardly so as to catch in its hook a main yarn 190 which has just been fed. In Fig. 32 the needle is shown fully retracted. The fabric loops extend into the notch 197 and the new loop of the main yarn 190 extends between the bottom of this notch and the hook of the needle. Terry loops 194 are being drawn out by the sinker. The needle is then advanced again to clearing position as shown in Fig. 33 and the sinker withdrawn for the introduction of a main yarn 190 at a lower level in line with the throat 122d, as shown in Fig. 34, the needle having been retracted slightly to bring the tip of the latch below this level. It will be noted that the fabric loops in this instance are at this level rather than at the upper level in which they are shown in Figs. 31, 32, and 33. The sinker is then advanced, and a rear yarn 191 is then introduced on an upper level as shown in Fig. 35. The advance of the sinker at this time is halted at a point such that, as shown in Fig. 36, terry loops 193 will be drawn out over the nib 199 of the sinker instead of being seated in the notch 197 as was the main yarn in Fig. 32. Fig. 37 shows the needle moving up and the sinker moving back to the position of Fig. 29.

In the form of fabric exemplified in Figs. 38–39 main yarn 200 is knit to form jersey loops, rear terry yarn 201 is plated therewith and drawn out into terry loops 203, front terry yarn 202 is, in the present instance, also plated therewith and is drawn out to form front terry loops 204.

A manner of forming the fabric of Figs. 38–39 by mechanism of the general character exemplified in Fig. 9 and including sinkers 110e is shown in Figs. 40–44. The needle is moved to fully-advanced position and then partially retracted so that the fabric loop is under the latch. As shown in Fig. 40, the front yarn 202 is fed above the tip of the latch in line with the throat 122e. As the sinker moves forward, its nib 199e moves under the fabric supported by the hump 151e, and a main yarn 200 is fed above this nib as shown in Fig. 41. Fig. 42 shows the main yarn 200 seated in the dip 177e, the front yarn 202 drawn out to form a sinker terry loop 204, and the back yarn 201 being fed beneath the needle hooks. In Fig. 43 the needle is shown fully retracted with all three newly introduced yarns pulled thru the old loops. The terry loops 203 and 204 are still on the sinker. In Fig. 44 the needle is shown fully advanced, and the sinker ready to be retracted to the position in Fig. 40.

In Fig. 45 there is shown a form of fabric similar to that of Fig. 38 except that the front yarn is plated in one course and the rear yarn in another course, and that the rear yarn is wrap yarn appearing only in a design portion of the fabric. As exemplified, main yarn 205 is knit into jersey loops, and front yarn 206 is plated therewith in alternate courses and is drawn out into sinker terry loops 207. A wrap yarn 208 is knit in one direction (forward) to form two plated loops 209 in a course intermediate two of the courses where the front yarn 206 is plated, and is drawn out into a rear terry loop 210. It is inlaid in the opposite direction, and is then knit in the forward direction to form four plated loops 211 in the next course but one, and is drawn out to form three rear terry loops 212; it is again inlaid in the opposite direction, and then knit in the forward direction to form six plated loops 213 in the next row but one, and is drawn out to form five rear terry loops 214. In this manner, one end of a diamond-shaped design, the apex of a trinangular design, the head of a spear, or the like, can be formed in terry design yarn. Control of the needles to form such designs may be effectuated in any well known or suitable manner.

Sinker control for the formation of this and other terry design fabrics may be effectuated by the use of mechanism such as shown in Figs. 46, 47, 47a, 47b, and 48. The mechanism as exemplified is similar to that shown in Fig. 9 except that one or more pattern wheels 220 are provided for the selective control of the deposit of a yarn in either of two sinker slots, for example slots 120f and 121f.

When the sinker is selectively moved forward, as shown in full lines in Fig. 46, the rear yarn 21 will be fed into the slot 121f so that, when the sinker is further advanced, a terry loop will be formed, as indicated at Fig. 47a; whereas, when the sinker remains in its retracted position, the rear yarn can be drawn down into the main yarn slot 120f so that it will be plated with the main yarn loops. The pattern wheel is formed with the usual teeth 222 which mesh with edges 223 on the body of the sinkers for rotation of the wheel. At desired points, inserts 225 may be provided to selectively advance the sinkers. In order to permit the pattern wheel to engage and operate the sinkers without danger of breakage to either the teeth or the sinkers even in fairly fine gage machines, the sinkers 110f are, pursuant to the invention, formed with cut-out portions 226 just inwardly of the edges 223 at the points where the teeth would otherwise tend to bear against the sinkers as the teeth begin to mesh with or to leave the sinkers. The cut-out portions 226 have a length slightly greater than the width of the teeth.

Instead of providing a pattern wheel 220 meshing with edge portions 223 on the body of the sinkers there may be employed a similar pattern wheel 220g meshing with edge portions 223g on the tails of the sinkers as shown in Fig. 48. In this instance cut-out portions 226g are provided just inwardly of the edges 223g.

Other design effects may be obtained by forming a yarn into terry loops in certain of the portions in which it appears and leaving it unknit in other of those portions. One form of such fabric is exemplified in Figs. 49 and 50 wherein there is provided background yarn 235 and wrap terry yarn 236 which may be incorporated into design portions in a manner generally similar to the manner in which the yarn 208 was incorporated into the fabric in Fig. 45. In Figs. 49 and 50, however, the yarn 236 is drawn into terry loops 237 only in an annular design portion 238 and is knit into jersey loops 239 in a central circular portion 240. In the portion 238 the main yarn 235 is knit and the yarn 236 plated therewith, but in the portion 240 the yarn 235 is inlaid.

The terry yarn, instead of being knit in the portion in which it is not drawn into terry loops may itself be inlaid as exemplified in Figs. 51 and 52. Here background yarn 245 is knit thruout the fabric, the warp yarn 246 is drawn into terry loops 247 in an annular portion 248, and is inlaid, as indicated at 249, in a central circular portion 250.

Other variants will be apparent. In Figs. 53 and 54 there is shown a form of fabric wherein a background yarn 255 is knit outside the design portion and in a central circular portion 260. A wrap terry yarn 261 is knit in an annular design portion 262 and the yarn 255 is inlaid therein, and the yarn 261 is carried thru the central portion 260 of the fabric without being caught into it, being drawn into terry loops 263 therein.

A notch in the top surface may, in various types of sinkers, serve instead of an upper nib and throat. One such sinker is shown in Fig. 55. In this sinker, the cut-down portion and the hump are omitted, and the upper surface of the forward portion extends horizontally. The upper surface of the middle portion of the sinker is formed with a notch 197h which is utilizable similarly to the notch 197.

Since certain changes may be made in the above constructions and different embodiments of the invention could be made without departing from the scope thereof, it is intended that all matter contained in the above description or shown in the accompanying drawing shall be interpreted as illustrative and not in a limiting sense. Certain subject matter disclosed but not claimed herein is claimed in my copending application Serial No. 587,250 filed May 25, 1956, which is a division of the present case.

I claim:

1. Knitted terry fabric comprising main yarn and wrap yarn and having a plural-wale and plural-course portion comprising said main yarn and said wrap yarn, and portions at the sides of the first-mentioned portion comprising said main yarn but not said wrap yarn, at least one of said yarns being knitted in the first-mentioned portion and said main yarn being knitted in the last mentioned portions, and at least one of said yarns being drawn into terry loops in said first-mentioned portion.

2. Knitted terry fabric as set forth in claim 1 wherein a third yarn is knitted and drawn into terry loops in all of said portions.

3. Knitted terry fabric comprising main yarn and wrap yarn and having a plural-wale and plural-course portion comprising said main yarn and said wrap yarn, and portions at the sides of the first-mentioned portion comprising said main yarn but not said wrap yarn, at least one of said yarns being knitted in the first mentioned portion and being drawn into terry loops between the knitted loops thereof.

4. Knitted terry fabric comprising main yarn, front yarn, and wrap yarn and having a plural-wale and plural-course portion wherein said main yarn is knitted and said front yarn is plated therewith and formed into terry loops in at least one course but not in an adjacent course and said wrap yarn is plated with the main yarn and formed into terry loops in said adjacent course and caught into the fabric without knitting in said one course, said main yarn being knitted at the sides of said portion and said front yarn being plated with said main yarn in at least said one course at the sides of said portion.

5. A knitted terry fabric as set forth in claim 3 wherein said front yarn is formed into terry loops at the sides of said portion.

6. Knitted terry fabric as set forth in claim 1 wherein a yarn in at least a portion of the fabric is caught between the loops of a knitted yarn without knitting and drawn out to provide a layer of terry loops at a multiplicity of walewise and coursewise points in said first-mentioned portion.

7. Knitted terry fabric as set forth in claim 1 wherein at least certain of the terry loops are formed in the wales at the sides of which the terry yarn is caught.

8. Knitted terry fabric as set forth in claim 6 wherein at least certain of the terry loops are formed in wales other than the wales at the sides of which the terry yarn is caught.

9. Knitted fabric as set forth in claim 8 wherein the last-mentioned wales are alternate wales and said other wales are intermediate wales.

10. Knitted terry fabric as set forth in claim 1 wherein said terry loops are provided on one side of the fabric and where a yarn other than said one of said yarns provides terry loops on the other side of said fabric.

11. Knitted terry fabric as set forth in claim 1 wherein in at least a portion of the fabric which comprises knitted yarn there is provided yarn drawn into sinker terry loops on one side of the fabric, and yarn caught between the loops in one row and the sinker loops in an adjacent row and drawn into terry loops on the other side of the fabric in the wales between the points where it is caught.

12. Knitted terry fabric as set forth in claim 1 wherein in at least a portion of the fabric which comprises knitted yarn there is provided yarn caught between the loops on one row and the sinker loops in an adjacent row at the sides of spaced wales and drawn into terry loops therebetween, and other terry yarn caught between the loops in one row and the sinker loops in an adjacent row at the sides of intermediate wales and drawn into terry loops therebetween.

References Cited in the file of this patent

UNITED STATES PATENTS

| | | |
|---|---|---|
| 777,048 | Scott | Dec. 6, 1904 |
| 1,179,467 | Stafford et al. | Apr. 18, 1916 |
| 1,179,963 | Stafford et al. | Sept. 12, 1916 |
| 1,426,576 | Lombardi | Aug. 22, 1922 |
| 1,441,110 | O'Lena | Jan. 2, 1923 |
| 1,686,172 | Porte | Oct. 2, 1928 |
| 1,766,805 | Wakefield | June 24, 1930 |
| 1,949,319 | McAdams | Feb. 27, 1934 |
| 2,080,377 | Nebel | May 11, 1937 |
| 2,150,773 | Lawson et al. | Mar. 14, 1939 |
| 2,207,397 | Fleisher | July 9, 1940 |
| 2,231,672 | Lombardi | Feb. 11, 1941 |
| 2,269,089 | Hanisch | Jan 6, 1942 |
| 2,361,152 | Saussaman et al. | Oct. 24, 1944 |
| 2,693,687 | Levin | Nov. 9, 1954 |

FOREIGN PATENTS

| | | |
|---|---|---|
| 428,377 | France | June 20, 1911 |